US006986933B2

(12) United States Patent
Higashi

(10) Patent No.: US 6,986,933 B2
(45) Date of Patent: Jan. 17, 2006

(54) POWDERY SINGLE-LAYER FILM LAMINATE AND PROCESS FOR PRODUCTION THE SAME

(75) Inventor: Kensaku Higashi, Shizuoka (JP)

(73) Assignee: Tomoegawa Paper Co., Ltd., Tokyo (JP)

(*) Notice: Subject to any disclaimer, the term of this patent is extended or adjusted under 35 U.S.C. 154(b) by 29 days.

(21) Appl. No.: 10/212,276

(22) Filed: Aug. 6, 2002

(65) Prior Publication Data

US 2003/0035926 A1 Feb. 20, 2003

(30) Foreign Application Priority Data

| | | |
|---|---|---|
| Aug. 8, 2001 | (JP) | 2001-240382 |
| Sep. 17, 2001 | (JP) | 2001-280941 |
| Sep. 17, 2001 | (JP) | 2001-280942 |
| Sep. 17, 2001 | (JP) | 2001-280943 |

(51) Int. Cl.
*B32B 5/30* (2006.01)

(52) U.S. Cl. ....................... 428/143; 428/345; 428/522

(58) Field of Classification Search ................ 428/143, 428/345, 522

See application file for complete search history.

(56) References Cited

U.S. PATENT DOCUMENTS

| | | | | |
|---|---|---|---|---|
| 6,235,850 | B1 * | 5/2001 | Perez et al. | 525/384 |
| 6,383,558 | B1 * | 5/2002 | Fujiwara et al. | 427/164 |
| 6,569,494 | B1 * | 5/2003 | Chambers et al. | 427/180 |

FOREIGN PATENT DOCUMENTS

| | | |
|---|---|---|
| JP | P2000-171618 A | 6/2000 |
| JP | P2001-74920 A | 3/2001 |
| JP | P2001-98386 A | 4/2001 |
| JP | P2001-100012 A | 4/2001 |
| JP | P2001-108805 A | 4/2001 |

* cited by examiner

*Primary Examiner*—William P. Watkins, III
(74) *Attorney, Agent, or Firm*—McDermott Will & Emery LLP

(57) ABSTRACT

A powdery single-layer film laminate having excellent scratch resistance and stain resistance is produced. The powdery single-layer film laminate comprises a substrate, a binder layer and a powdery single-layer film composed of a large number of powdery particles embedded in a single-layer in a partially protruded state on the surface of said binder layer, and said binder layer has Tg of at least 60° C. or has substantially no Tg. An example of the method of producing it comprises applying a coating liquid of a polymer resin in an organic solvent to a substrate and drying to form a coating layer in which the organic solvent partially remains, attaching powdery particles to and embedding in the surface of the formed coating layer, and removing the excess powder attaching to the surface of the coating layer and removing the residual organic solvent.

2 Claims, No Drawings

POWDERY SINGLE-LAYER FILM LAMINATE AND PROCESS FOR PRODUCTION THE SAME

BACKGROUND OF THE INVENTION

1. Field of the Invention

The present invention relates to a powdery single-layer film laminate comprising a substrate, a binder layer and a powdery single-layer film composed of a large number of powdery particles embedded in a state of a monoparticle layer in the binder layer so as to partly project from the surface of the binder layer, and to methods of producing the same.

2. Related Arts

A powdery single-layer film laminate comprising a substrate, a binder layer and a powdery single-layer film composed of powdery particles embedded in a state of a monoparticle layer in the binder layer so as to partly project from the surface of the binder layer has already been disclosed in Japanese Patent Application Laid-open Nos. 2000-171618, 2001-074920, 2001-098386, 2001-100012 and 2001-108805. According to these patent applications, the powdery single-layer film can be produced by a process comprising forming a binder layer on a substrate with a pressure-sensitive adhesive, embedding a filler (powdery particles) in the binder layer by means of pressing media, and removing the surplus filler.

According to the methods for production described in the above-mentioned patent applications, an excellent powdery single-layer film having high uniformity which was not be obtained by the prior arts can be produced. The resultant powdery single-layer film laminate however has problems of having inferior scratch resistance and being easily stained.

These problems are caused by use of a pressure-sensitive adhesive for forming the binder layer. Since the formation of the binder layer using a pressure-sensitive adhesive is an inevitable step in view of the principle of the above-mentioned method, a means for solving the above-mentioned problems are not be found yet.

SUMMARY OF THE INVENTION

Accordingly, it is an object of the present invention to solve the above-mentioned problems in the prior arts. The object of the present invention is therefore to provide a powdery single-layer film laminate having excellent scratch resistance and being hardly stained, and to provide methods for producing the same.

As a result of earnest studies about the means for solving the above-mentioned problems without changing the essential process for producing the powdery single-layer film laminate, the present inventors have found that the tackiness of the binder layer is a function necessary in only the case of attaching the powdery particles and embedding in a binder layer, and such tackiness is not necessarily required before and after attaching and embedding powdery particles. On the basis of this knowledge, the present inventors have found out that these problems are solvable by using an organic solvent solution of a high polymer resin which has Tg of a certain temperature beyond room temperature instead of using the conventional pressure-sensitive adhesive as a component of the binder layer. And as a result of further studying how to give still more sufficient adhesive strength for attaching the powdery particles to this high polymer resin layer, the present invention has been completed.

The powdery single-layer film laminate according to the present invention comprises a substrate, a binder layer and a powdery single-layer film composed of a large number of powdery particles embedded in a single-layer in a partially protruded state on the surface of said binder layer, said binder layer has Tg of at least 60° C. or has substantially no Tg.

The first aspect of the method for producing the powdery single-layer film laminate according to the present invention comprises (1) a step of forming a coating layer with the tackiness on at least a side of said substrate by applying a coating liquid of a polymer resin in an organic solvent or water or a coating liquid composed of a hardening liquid component, and drying or hardening the resultant layer so as to leave a part of said organic solvent, water or a hardening liquid component, (2) a step of attaching powdery particles to and embedding in the surface of the formed coating layer, and (3) a step of forming a binder layer in which the powdery particles are embedded, by removing the excess powder attaching to the surface of the coating layer and removing the residual organic solvent or water from the coating layer or hardening the hardening liquid component, wherein said binder layer has Tg of at least 60° C. or has substantially no Tg, whereby the powdery single-layer film laminate comprising a binder layer and a powdery single-layer film composed of a large number of powdery particles embedded in a single-layer in a partially protruded state on the surface of said binder layer is obtained.

The second aspect of the method for producing the powdery single-layer film laminate according to the present invention comprises (1) a step of providing a coating layer containing a thermoplastic resin, (2) a step of applying an organic solvent to the surface of said coating layer to give adhesive strength sufficient to adhere powdery particles to the surface of said coating layer, (3) a step of attaching powdery particles to and embedding in the surface of the formed coating layer, and (4) a step of forming a binder layer in which the powdery particles are embedded, by removing the excess powder attaching to the surface of the coating layer and removing the residual organic solvent from the coating layer, wherein said binder layer has Tg of at least 60° C. or has substantially no Tg, whereby the powdery single-layer film laminate comprising a binder layer and a powdery single-layer film composed of a large number of powdery particles embedded in a single-layer in a partially protruded state on the surface of said binder layer is obtained.

In the powdery single-layer film laminate according to the present invention, the powdery single-layer film laminate may be formed imagewise. In this case, an organic solvent is applied imagewise to the surface of the coating layer in the step (2) of the above-mentioned method of the second aspect so as to form an image-like area having adhesive strength sufficient to adhere the powdery particles. Thus, a powdery single-layer film laminate in which a powdery single-layer film is formed in the state of image can be obtained.

Tg means glass transition temperature and can be measured by using DSC or dynamic viscoelasticity measurement equipment. Incidentally, the term "single-layer" as used herein means a state that the powdery particles are arranged on the surface of the binder layer as evenly as possible without overlapping one another. The term "powdery single-layer film" as used herein means a film of such a state, that is, a monoparticle layer.

DETAILED DESCRIPTION OF THE PREFERRED EMBODIMENTS

The present invention will be illustrated in detail hereinafter. Materials for constituting each layer of the powdery single-layer film laminate according to the present invention will be described in each step of the method for producing the powdery single-layer film laminate.

First, the first aspect of the method of producing a powdery single-layer film laminate will be illustrated. In the first step, a coating layer with the tackiness in the state that an organic solvent or liquid hardening component partially remains is formed on at least a side of a substrate.

Various kinds of materials, such as metal, plastic, rubber, paper, glass, ceramic, etc. may be used for the substrate, and the substrate having various kinds of shapes, such a board, a cylinder, a wire rod, a block, a sheet, etc. can be used in the present invention. However, a substrate in the shape of a sheet which can be rolled round is preferably used in the present invention, because a binder layer having uniform thickness can be prepared on such a substrate with good productivity. Examples of such a substrate in the shape of the sheet include paper, various kinds of synthetic resin films, sheet-like rubber, metal foil, laminates of them, etc. Examples of the synthetic resin for forming the synthetic resin film include polyethylene terephthalate (PET), polyethylenenaphthalate, triacetyl cellulose, polycarbonate, the polyarylate, polyimide, aromatic polyamide, polysulfone, polyether sulfone, cellophane, polyethylene, polypropylene, polyvinyl alcohol, cycloolefin resin, etc. These resins can be used individually or as a mixture of them, and they may be used as a laminate of two or more synthetic resin films.

Moreover, as the sheet-like substrate, may be used both of a transparent substrate and an opaque substrate depending on the use thereof. The thickness of it is preferred to be in a range of from 1 micron to 5 mm in view of productivity. Regarding the synthetic resin film, a film thicker than 5 mm can be used, if the film is porous and is composed of a material having low rigidity so as to have fine air-cells in the film. In addition, although the sheet-like substrate is used without providing with another layer, it is possible to previously form another layer on the surface of it.

A coating liquid of a polymer resin in an organic solvent or water or a coating liquid composed of a hardening liquid component is applied to at least one side of the substrate, followed by drying or hardening to form a coating layer with tackiness in which a part of the organic solvent or water or a part of the hardening liquid component remains.

First, the coating liquid of a polymer resin in an organic solvent or water is illustrated. As the high polymer resin in the coating liquid, a thermoplastic resin which is solid at room temperature and a thermosetting resin which is solid at room temperature can be used. They are preferred to have a glass transition temperature: Tg of 60° C. or higher. Specific Examples of the thermoplastic resin include polyvinyl alcohol (Tg: 85° C.), polyvinyl acetal (Tg: 110° C.), polyvinyl butyral (Tg: 60–90° C.), acrylic resin represented by polymethyl methacrylate (Tg: 105° C.), methyl methacrylate copolymer, etc., polystyrene (Tg: 100° C.), styrene copolymer, styrene-acrylic copolymer, polyacrylonitrile (Tg: 97–125° C.) and acrylonitrile copolymer, polyvinyl chloride (Tg: 81–98° C.), vinyl chloride-vinyl acetate copolymer (Tg: 65° C.), polyester resin represented by the polyethylene terephthalate (Tg: 80–100° C.), polyurethane resin, polyamide resin, polyimide resin, polycarbonate (Tg: 145° C.), epoxy resin, cellulose system resin represented by cellulose acetate butyrate (Tg: 85–140° C.), and cellulose acetate propionate (Tg: 140–160° C.), etc. These resins may be used individually or as a mixture of them. They may be modified by, for example, graft polymerization, etc. Moreover, various hardening agents, such as melamine, epoxy compounds, isocyanate compounds, can be added to these resins, if necessary, so that the scratch resistance of the binder layer can be improved by finally cross-linking them.

Specific Examples of the thermosetting resin include epoxy resin, phenol resin, melamine resin, urea resin, acrylic resin, etc., which can be used by adding suitable hardening agents and hardening accelerators.

The above-mentioned high polymer resin is coated on the substrate as a coating liquid in the state of solution or emulsion of the polymer resin in an organic solvent or water. Specific examples of the organic solvent for preparing the coating liquid in such a state include alcohols such as methanol, ethanol, isopropropanol, n-butyl alcohol, etc., ketones such as acetone, methyl ethyl ketone, methyl isobutyl ketone, cyclohexanone, etc., esters such as ethyl acetate, isobutyl acetate, cellosolve acetate, etc., ethers such as a tetrahydrofuran, methyl cellosolve, cellosolve, carbitol, etc., hydrocarbons such as toluene, xylene, rubber volatile oil, mineral spirit, etc., and amide solvents such as formamide, dimethylformamide, dimethylacetamide, etc. They may be used individually or as a mixture of them. In the case of the mixture, it is preferred to blend two or more organic solvents having each different volatility, so that the solvent having a high boiling point remains in the coating layer to give tackiness. Furthermore, the organic solvent to which water is added may be used.

In the invention, the above-mentioned coating liquid may contain the above-mentioned thermoplastic resin or thermosetting resin alone or may contain both of them as a mixture. Regarding the high polymer resin contained in the coating liquid, it is preferred that 60% by weight or more of the whole polymer resin is the polymer resin having Tg of 60° C. or higher. It is more preferable that 80% by weight or more is the polymer resin having Tg of 60° C. or higher.

Next, the coating liquid composed of a hardening liquid component is illustrated. The hardening liquid component in the coating liquid means thermosetting resin material or photosetting resin material which is in the state of liquid at room temperature before being hardened by heating or irradiation of light rays. Specific examples of the hardening liquid component include oligomers and monomers which are in the unhardened state of liquid or have fluidability at the beginning and which are polymerized or cross-linked by heating or irradiating ultraviolet rays to finally produce thermosetting resin or photosetting resin having Tg of 60° C. or higher or having substantially no Tg. Furthermore, a solution of a thermosetting or photosetting resin which is solid at room temperature and a hardening agent in an organic solvent can be used as the hardening liquid component. The other examples include inorganic materials which are liquid at room temperature before hardening, such as hydrolyzed condensates of water glass, alkoxysilane, etc.

One or more of the above-mentioned hardening liquid component may be used as it is as the hardening liquid component as the coating liquid, or may be used as the coating liquid composition comprising the below-mentioned hardening agent, hardening accelerator, photopolymerization initiator, etc.

Specific examples of the oligomer and monomer of the thermosetting resin include oligomers and monomers for epoxy resin, phenol resin, melamine resin, urea resin, acrylic resin, etc. They can be used together with a suitable hardening agent, hardening accelerator, photopolymerization initiator, etc., respectively.

As the oligomer and monomer of epoxy resins, it is possible to use bisphenol A type compounds, bisphenol F type compounds, phenol novolak type compounds, cresol novolak type compounds, alicyclic compounds, etc., which can be hardened by heating with a hardening agent such as amine type, polyaminoamide type, acid anhydride type, imidazole type, etc.

In the case of combination of liquid bisphenol A type epoxy compound and amine type hardening agent, the hardened binder layer shows Tg of 100–150° C. in general, though it depends upon the kind of the hardening agent, combination ratio and hardening conditions. The oligomer and monomer of epoxy resin can be hardened by irradiating ultraviolet rays, if a cationic photopolymerization initiator is added. The Tg of the hardened materials is about 110° C. in the case of the liquid bisphenol A type epoxy compounds and about 130° C. in the case of the alicyclic epoxy compounds.

As the oligomer and monomer of the photosetting resin, it is possible to use a composition comprising as indispensable components an acrylic oligomer, an acrylic monomer and a photopolymerization initiator, which forms a hardened film by radical photopolymerization reaction. Examples of acrylic oligomer include polyester acrylate which is obtained by introducing acryloyl groups in polyester made of a polyhydric alcohol and a polybasic acid, epoxy acrylate which is obtained by introducing acryloyl groups in epoxy resin such as bisphenol A type, novolak type, alicyclic type, etc., and polyurethane acrylate which is obtained by reacting a polyisocyanate compound with hydroxyl group of polyester and reacting an acrylate having a hydroxyl group with the unreacted isocyanate group. Specific examples of the acrylic monomer include polyfunctional acrylates such as hydroxypivalic acid ester neopentylglycol diacrylate, trimethylolpropane triacrylate, dipentaerythritol hexaacrylate, etc. for increasing the crosslinking density, and monofunctional acrylates such as lauryl acrylate, 2-ethylhexyl acrylate, 2-hydroxyethyl acrylate, 1,6-hexanediol monoacrylate, dicyclopentadiene acrylate, etc. for controlling viscosity or improving hardenability. Upon using these acrylates, oral toxicity and first skin stimulation rate (PII) should be also considered.

The photopolymerization initiator, which absorbs ultraviolet rays to initiate the polymerization reaction of the above-mentioned acrylic oligomer or acrylic monomer, is classified into a radical reaction type and an ionic reaction type according to the reaction mechanism. As the radical reaction type initiator, there are cleavage type initiator such as benzoin, benzoin ether, benzylketal, etc. and hydrogen abstraction type initiator such as benzyl, benzophenone, Michler ketones, etc. The ionic reaction type initiator includes cationic polymerization initiators, such as diazonium salts, diaryliodonium salts, triarylsulfonium salts, etc. having $PF_6^-$ or $SbF_6^-$ as anion. This cationic polymerization initiator can initiate polymerization of not only oligomer and monomer of the acrylic resin but oligomer and monomer of the above-mentioned epoxy resin, a vinyl ether compounds, and the oxetane compounds. In addition, it is also possible to add a photosensitizer such as amine compounds for accelerating hardening and various kinds of dyes for improving spectral sensitization. In the case that a hard coat material containing polyfunctional monomer in a high content is used as the photosetting material, it is possible to form a binding layer having no Tg, because of highly advanced three-dimensional cross-linkage.

In the present invention, the above-mentioned coating liquid composed of a hardening liquid component may be used by mixing with the above-mentioned coating liquid of the polymer resin in the organic solvent or water. Moreover, in order to increase adhesive strength of the coating layer for embedding powdery particles, it is also possible to use both the above-mentioned hardening liquid component and the above-mentioned thermoplastic resin having Tg of 60° C. or higher as a mixture.

In the present invention, to the above-mentioned coating liquid or coating liquid may be added various additives, such as a coupling agent, surface tension modifier, color pigment, dyestuff, wax, thickener, antioxidant, rust-preventive agent, antibacterial agent, ultraviolet absorbing agent, etc., if necessary.

In the method of producing the powdery single-layer film according to the present invention, the above-mentioned coating liquid is first applied to at least one side of the substrate. Various coating methods and printing processes, etc. can be used for the application. Specific examples of the coating method include air doctor coating, blade coating, knife coating, reverse coating, photogravure coating, micro photogravure coating, kiss coating, spray coating, dam coating, dip coating, die coating, etc. Specific examples of the printing processes include relief printing such as flexography, etc., intaglio printing such as direct gravure printing, offset gravure printing, etc., planography methods such as offset printing, etc., and stencil printing such as screen printing, etc. In the present invention, of these coating methods and printing processes, the optimum method may be chosen depending on type and shape of the substrate. In the case of using a film-like substrate, a coating method in which application is continuously carried out by moving the substrate at a fixed speed can be adopted.

The formed coating layer is dried or prehardened after application of the coating liquid or coating liquid. In this case, it is necessary that the organic solvent, water or hardening liquid component partially remains in the coating layer at least before embedding the powdery particles in the state of single-layer so that the coating layer has the tackiness sufficient to adhere powdery particles thereto. Therefore, according to the present invention, in the case of using the coating liquid containing an organic solvent or water, a part of the organic solvent or water is allowed to leave without volatilizing completely so as to afford required tackiness, after application of the coating liquid. In the case of using the coating liquid composed of a hardening liquid component, the hardening liquid component is partially hardened to form a semi-cured state so as to have required tackiness. In the present invention, "the hardening liquid component partially remains" means the fact that the hardening liquid component remains in the above-mentioned semi-cured state.

In the present invention, the conditions of drying or prehardening, which are not restricted, may be controlled so as to form the coating layer having adhesive strength sufficient to adhere powdery particles by leaving a part of the organic solvent, water or hardening liquid component. Regarding adhesive strength, it is desirable that 180° peeling strength measured by JIS-Z-0237:1980 is 100 g/25 mm or more.

Incidentally, after preparing a coating layer having the above-mentioned tackiness, it is possible to temporarily preserve by laminating a releasing film on the coating layer before the subsequent second step. Thus, it becomes possible to give pliability to manufacture management.

The powdery particles are then attached to and embedded in the resultant coating layer in the second step. The thickness of the coating layer is preferred to be in a range of 0.5–2 times and particularly 0.01–2 times of the particle size of the embedded powdery particles. If the thickness of the coating layer is thinner than 0.01 times of the powder particle size, falling of the powder particle becomes easy to arise, when the powdery particles are allowed to adhere to the coating layer. If the thickness is thicker than 2 times, the powdery particles do not protrude on the surface because of too deeply embedding, or the powdery single-layer film sometimes cannot be formed because materials composing the coating layer ooze out on the surface of the powdery film and other powdery particles attach thereto. In the present invention, adhesion and embedding of the powdery particles may be carried out by one operation without separating them into below-mentioned two operations.

Various kinds of powdery particles can be used in the present invention. Specific examples of powdery particles consisting of inorganic material include particles of metals such as aluminum, zinc, copper, gold, silver, nickel, tungsten, iron, cerium, titanium, etc., alloys, oxides, nitrides and silicates of these metals, carbon black, diamond, graphite, silica, glass, atomization kelmet, bronze, sodium montmorillonite, zircon sand, silicon carbide, boron carbide, silicon nitride, kaolin, talc, sericite and calcium carbonate. As the powdery particles composed of organic material, those composed of various resins can be used. Specific examples of them include powdery particles of acrylic resin, polystyrene resin, styrene-acrylic copolymer resin, urethane resin, silicone resin, phenolic resin, epoxy resin, polyethylene resin, polypropylene resin, fluorinated resin, polyvinylidene fluoride resin, urea resin, melamine resin, etc. The resin composing the powdery particles should be chosen from these resins that do not dissolve in the organic solvent and hardening liquid component contained in the coating layer. In order to improve adhesive strength between the coating layer and the powdery particles, it is also possible to carry out coupling processing, coating, etc. of the surface of powdery particles.

In order to embed at a uniform depth and a high packing density in the coating layer by means of impulsive force of the below-mentioned medium, it is preferred that the powdery particles are spherical and that the particle size distribution is narrow. As a concrete particle size distribution, the range of 0.8–1.0 is desirable and the range of 0.9–1.0 is more preferable. The sphericity of the spherical particle is preferred in a range of 80% or more and more preferably 90% or more.

The particle size distribution of the above-mentioned powdery particles is defined by the following general formula (1).

$$\text{Particle size distribution}=\text{number average particle diameter}/\text{volume average particle diameter} \qquad (1)$$

Number average particle diameter: The mean value obtained by measuring the diameter of 100 powdery particles extracted at random.

Volume average particle diameter: It is obtained as follows. The powdery particles are considered as true sphere, and 100 powdery particles are extracted at random. The sum total volume is calculated from the diameter of the extracted 100 powdery particles. An accumulation volume accumulated from powdery particles of small volume becomes 50% of the sum total volume is regarded as the volume average particle diameter.

The sphericity is defined by the following general formula (2). In concrete, a projection image is obtained by the photographing of a powder particle by optical microscope or transmission electron microscope. The sphericity can be obtained by calculate from A and B obtained by image analysis of the projection image $$\text{Sphericity }(\%)=(4\pi A/B^2)\times 100 \qquad (2)$$

wherein A: A projected area of the powder particle. B: The circumference of the powder particle.

In the present invention, the particle size of the powdery particles (volume average particle diameter) is preferred to be in a range of 1–50 $\mu$m, and more preferably in a range of 3–30 $\mu$m. If the particle size is smaller than the above-mentioned range, it becomes difficult to embed the powdery particles in the state of single-layer in the coating layer. If it is beyond the above-mentioned range, the embedding in the coating layer becomes uneven in view of weight and volume of the powdery particles, and the possibility of falling in the step of removing surplus powdery particles, etc. rises.

In the case that the powdery single-layer film laminate is used as an optical film with the function of optical diffusion, etc., it is desirable to use materials having high transparency such as acrylic resin, styrene resin, acrylic-styrene copolymer resin, silicone resin, etc. as the powdery particles. It is further preferred to use powdery particles having a particle size (volume average particle diameter) in a range of 2–15 $\mu$m, a narrow particle size distribution and a high sphericity.

Next, the method of embedding the powdery particles in the coating layer is illustrated. In the present invention, the powdery particles are attached to and embedded in the coating layer with tackiness which was formed as described above by bringing in contact the coating layer with the powdery particles and a medium which are vibrated in a container. Alternatively, the powdery particles are previously attached on the coating layer and then the coating layer is brought in contact with the powdery particles and the medium which are vibrated in a container to embed the powdery particles in the coating layer. In the present invention, the medium is used for embedding the powdery particles. The powdery particles are hit by the impulsive force caused by vibration of the medium to embed the powdery particles in the coating layer. Use of the medium is particularly very important in order to push the other particles into the gaps between the powdery particles first attached to the coating layer so that the packing density of the powdery single-layer film becomes even and higher.

Specific examples of the medium used in the present invention include particles composed of iron, carbon steel, alloy steel, copper and copper alloy, aluminum and aluminum alloy, other various metals and alloys, particles composed of ceramics such as alumina, silica, titania, zirconia, silicon carbide, etc., and particles composed of glass, quartz, hard plastics or hard rubber, etc. Moreover, particles which are composed of hard plastics or hard rubber containing fine particles of the above-mentioned metal or alloy, ceramics, glass, etc. can also be used in the present invention.

As the above-mentioned medium, spheres having the diameter of 0.1–3.0 mm are used. In order to embed the powdery particles with a high packing density and at a uniform depth in the coating layer, the medium is preferred to have narrower particle size distribution and higher sphericity, though so it is not in comparison with the above-mentioned powdery particles. If the diameter of the medium is less than 0.1 mm, capability of embedding the powdery particles in the coating layer is inadequate because of small impulsive force, and the medium adheres to the coating layer together with the powdery particles. Further, there is also a problem in respect of handling, since the diameter is too small. On the other hand, the medium having a diameter of larger than 3.0 mm has fully large impulsive force. However, since the opportunity of transmitting the force to the coating layer is little, uniformity of the embedding is meager, and the powdery particles are easy to tend to fall away. Embedding conditions of the powdery particles are closely related to the specific gravity of the medium. Impulsive force increases even in the equal particle size, if a material of high specific gravity is used, while the impulsive force decreases to result in the inferior power of embedding the powdery particles, if a material of low specific gravity is used. There is therefore a tendency that a medium having a comparatively small size and high specific gravity are preferably used. It is accordingly necessary to choose the optimum medium in consideration of thickness and adhesive strength of the coating layer, diameter and specific gravity of the powdery particles, and depth that the powdery particles are embedded.

Upon carrying out the present invention, the above-mentioned powdery particles and medium are put in a container. It is preferred to vibrate them in the container so that they are sufficiently mixed to result in the state that the powdery particles attach to the surfaces of the medium. Regarding the state of the powdery particles attaching to the surface of the medium, the powdery particles may form either a monoparticle layer or a multiparticle layer. However, it is necessary to check both specific gravity and surface adhesion in advance, because such a combination of the powdery particles and the medium that they separate by vibration is not desirable.

No particular limitation is imposed on the quality of material and size of the container into which the powdery particles and the medium are put, if it can be endurable to both weight and vibration. However, it is necessary to devise the shape of the container according to the system of contacting the coating layer formed on the substrate with the vibrating powdery particles and medium. In the case that the container itself is vibrated so as to transmit vibration to the powdery particles and the medium, thereby the powdery particles being finally embedded in the coating layer, it is necessary to give uniform impulsive force to at least cross direction of the coating layer on the film-like substrate by means of the powdery particles and medium. Accordingly, it is desirable that the distance between the wall of the vibrating container and the surface of the coating layer is fixed via the powdery particles and medium at least in the cross direction of the substrate. The powdery particles and the medium can also be vibrated by means of another vibrator placed in the container, such as a vibrating plate, etc. without vibrating the container itself. In such a case, the distance from the surface of the coating layer or the position of the vibrator should be considered so as to give uniform force to the surface of the coating layer on the substrate. Furthermore, the container should be devised in the structure so that the powdery particles and the medium do no scatter from the container when they vibrate. When the substrate provided with the coating layer is not a continuous film but is a plate, a piece or the like, the whole substrate is processed by putting in the container containing the powdery particles and the medium. Therefore, it is necessary to devise the size and shape of the container, or a vibrating mechanism.

In order to vibrate the container containing the powdery particles and the medium, a vibrator placed in the container, such as a vibrating plate, etc., known oscillation equipments such as a vibrating motor and air vibrator, an electromagnetic excitation equipment and a mechanical vibration equipment using a cam, etc. can be used. These oscillating equipments have been used in large fields, such as a feeder, a hopper, a conveyor, a screen, parts feeders, parts alignment machines, a shaking table, a barrel finishing, etc. In the present invention, it is necessary that suitable equipment is chosen of these equipments in consideration of size of the substrate, kind of the medium, size and weight of the container and structure of the equipment. Furthermore, in order to embedding the powdery particles in a uniform depth with high packing density in the coating layer, it is necessary to control oscillation mode, exciting force, amplitude of the oscillation equipment through mounting positions thereof to the container and selection of the spring for the equipments, etc. Preferable frequency is in a range of to 200–4000 rpm, and particularly in a range of 1000–3000 rpm. If the frequency is smaller than 200 rpm, the force of the medium for embedding the powdery particles is weak and the processing requires long time, which is not desirable. If the frequency beyond 4000 rpm, the powdery particles are easily separated from the coating layer because of too large impulsive force, or conversely, the vibration from the vibrator or container becomes difficult to reach the coating layer, because the vibration is absorbed by the medium, which is not desirable. The selection of the model and decision of conditions should be carried out such a manner that both the powdery particles and the medium do not scatter out of the container or do not separate in the container, or they are not biased for the other in the container, in order that embedding of the powdery particles in the coating layer is carried out stably for a long period of time by moving the long substrate provided with the coating layer. Furthermore, it is preferred that the powdery particles and media slowly flow so that the particles contacting with the coating layer change for other particles.

Subsequently, in the third step, the surplus powdery particles adhering to the surface are removed from the coating layer where the powdery particles were embedded as mentioned above, followed by drying or hardening the coating layer to remove the residual organic solvent or hardening liquid component to form a binder layer having a powdery single-layer film. The removal of the surplus powdery particles may be carried out after drying or hardening of the coating layer, even if it is done prior to drying or hardening.

Next, the method of removing the surplus powdery particles is illustrated. After embedding the powdery particles in a coating layer using the medium as mentioned above, or after drying or hardening the coating layer further, surplus powdery particles adhere on the coating layer or the binder layer of the substrate by interparticle forces such as electrostatic force and van der Waals force. Therefore, it is necessary to remove them. As the method for removing them, there can be used a method of scratching by a blade, a method of clearing by a brush, a method of wiping off with cloth, and a method of blowing away by air blow. Though these methods are usefulness to some extent, it is insufficient for perfectly removing the surplus powdery particles. Therefore, it is required to perform finally wet cleaning with water or an aqueous solution containing a cleaning auxiliary, when these methods are used. Regarding the wet cleaning, a water jet which is performed by blowing out water from a nozzle in a good force is effectively used. However, since there is a possibility that the cleaning becomes insufficient only in the removal by hydrostatic pressure for fine particles having the particle size of 15 μm or less in the powdery particles, it is desirable to wash sufficiently with deionized water, etc., after ultrasonic cleaning is carried out by dipping in ion-exchanged water containing cleaning auxiliaries such as a surfactant, etc. Moreover, it is required to remove moisture finally after performing such wet cleaning. In order to remove moisture, a method for squeezing the moisture throughout between rubber covered rolls, a method of absorbing and wiping the moisture by absorbent rolls or mats, etc. and a method of blowing the moisture away by the air blow can be used. There is a case that the moisture cannot be removed completely by these methods. In such a case, it becomes also necessary to put cold blast and hot blast for a sufficient time or to dry with heat by means of an infrared ray heater.

The above-mentioned coating layer is then dried to remove the residual organic solvent or is heated or irradiated by ultraviolet rays to remove the residual hardening liquid component by conclusion of polymerization or crosslinking reaction, thereby forming a binder layer having a powdery single-layer film in which each powder particle is embedded in the state of partially protruding on the surface.

In this invention, the binder layer formed as mentioned above is necessary to have Tg of 60° C. or higher or to have substantially no Tg. If the Tg of the binder layer is 60° C. or higher, the produced powdery single-layer film laminate does not soften in the usual use and it retains the strong binding strength. The term "no Tg" means that the resin of the binder layer is cross-linked highly and 3-dimensionally and does not cause glass transition under a heat decomposition temperature. In addition, in the present invention, the binder layer obtained by finally solidified or hardened is preferred to have a pencil hardness of HB or more. The term "pencil hardness" means hardness measured based on JIS-K-5400 of the binder layer which is formed on a PET film and completely solidified or hardened by photo-irradiation or heating.

In the present invention, the binder layer is composed of the above-mentioned thermoplastic resin or thermosetting resin as a main component and, if desired, the above-mentioned other components. The thermoplastic resin or the thermosetting resin is preferred to be occupied in the binding layer 60% by weight or more and particularly 80% by weight or more.

Next, the second aspect of the method of producing the single-layer powder film laminate will be illustrated. First, a coating layer containing a thermoplastic resin is formed on at least one side of the substrate in the first step. As the substrate and the thermoplastic resin, the above-mentioned ones may be used, and the thermoplastic resin having Tg of 60° C. or higher is suitably used.

The coating layer can be formed by preparing a coating liquid in the state of solution or emulsion which is prepared by dissolving or suspending the above-mentioned thermoplastic resin and, if desired, other components in water or an organic solvent, and applying or printing it on the above-mentioned substrate.

The coating layer formed by applying the coating liquid is then dried with heat to volatile the organic solvent to form a dry coating layer which has substantially no tackiness. In the second aspect of the method according to the present invention, since a coated product in which the dry coating layer is formed on the substrate is produced on the way of a series of manufacturing steps, there is an advantage that use of a releasing film which was required in case of applying a pressure-sensitive adhesive in the prior arts is avoidable. Therefore, according to this method, it is possible to pile up the coated products on the way of the process, and to roll round in the state as it is in carrying out continuous coating. Accordingly, the production becomes easy, and the products become cheap.

Then, in the second step, an organic solvent was supplied to the surface of the coating layer formed as described above to give the adhesive strength sufficient to attack the powdery particles to the coating layer. The organic solvent may be applied imagewise to the coating layer to form an image-like area which has the adhesive strength sufficient to attach the powdery particles. As the organic solvent used here, the same organic solvent as that used for preparation of the coating liquid can be used. Moreover, the above-mentioned organic solvent may contain various hardening agents which are liquid at room temperature, such as melamine, epoxy compounds, isocyanate compounds, etc. Addition of the liquid hardening agent to the organic solvent improves the surface strength of the formed binder layer after removal of the organic solvent from the coating layer.

As a means to supply the organic solvent, the above-mentioned various kinds of coating methods and printing methods can be utilized. In the step of supplying the organic solvent to the surface of the coating layer, however, the optimal combination of solvents should be chosen by fully examining a kind and a feed amount of the organic solvent and the coating method thereof, since the tackiness is manifested by dissolving at least the surface of the once formed coating layer. If the feed amount of the organic solvent is large or the method which rubs a coating layer strongly is used for application, there is the possibility that the once formed coating layer completely dissolves and flows down or that scratch injury such as stripe arises on the coating plane. Therefore, the attention should be paid in such a case.

Moreover, in the case of supplying imagewise the organic solvent, various kinds of the above-mentioned printing methods can be used as the supply means. It is also possible to carry out spray coating using a mold, but ink jet technology is preferred in order to obtain detailed images. Ink jet, which is utilized for public printers, etc. and is well-known, is a technology by which recording is performed using an aqueous or alcoholic ink by flying in the droplet state. Regarding the industrial application, it is utilized abundantly in order to write a lot number, etc. on electric parts, machine parts, beverage cans and packaging materials using an ink comprising an organic solvent such as methylethylketone. In the present invention, it is desirable to supply imagewise on the above-mentioned coating layer only using the organic solvent which contains no coloring ingredient with the ink jet equipment used for industrial applications. Thus, a powdery single-layer film laminate having a powdery single-layer film in a high-definite image state can be obtained, which cannot be obtained by the prior methods.

After supplying the organic solvent, a part of the organic solvent is removed, if needed, by drying to give tackiness sufficient to attach the powdery particles to the coating layer. In this case, it is preferred to have an adhesive strength that 180-degree peeling strength shown by JIS-Z-0237: 1980 is 100 g/25 mm or more.

Subsequently, in the third step, the powdery particles are allowed to adhere to the surface of the coating layer to which the organic solvent was supplied so as to give tackiness, and the powdery particles are embedded. When the organic solvent is supplied imagewise, the powdery particles are embedded in the image-like area of the coating layer. The third step can be carried out by the same manner as described in the second step of the above-mentioned first aspect of the method according to the present invention.

In the fourth step, the surplus powdery particles on the surface of the coating layer are removed and the residual organic solvent remaining in the coating layer is removed, whereby a binder layer in which powdery particles are embedded can be formed. Removal of the surplus powdery particles can be carried out by the same manner as described in the third step of the above-mentioned first aspect of the method according to the present invention. Removal of the organic solvent can be carried out by drying.

In the powdery single-layer film laminate which has the above-mentioned layer structure, layers such as an adhesion layer, a coloring layer, an electrically conducting layer, an electrification layer, an antistatic layer may be provided between the substrate and the binder layer. It is further possible to laminate plural resin layers which are composed respectively of different resin on the powdery single-layer film. The powdery single-layer film can be formed simultaneously or one by one on both sides of the substrate by the above-mentioned method. When the powdery single-layer film is formed only on one side, the back of the substrate may be processed by other processings such as coating, vacuum evaporation, adhesion processing, etc. afterwards. When the powdery single-layer film laminate of the present invention is used for an optical film, it is possible to delicately adjust optical transmission performance, reflection performance, optical diffusion performance, etc. by taking a refractive index into consideration about the substrate, the binder layer, the powdery particles, and the resin layer, if formed, on the powdery single-layer film.

In the present invention, still another resin layer can be formed on the powdery single-layer film, if desired, for the purpose of raising surface strength. By forming such a resin layer, it is possible to fulfill adjustment of all light transmittance and haze value as optical characteristics, prevention of blocking, improvement of reliability of optical characteristics, etc., when it is used for the optical film. In the case that another resin layer is formed on the powdery single-layer film, the under layer thereof is neither restricted to either the coating layer having tackiness nor to the binder layer having no tackiness.

In the case of providing a resin layer on the powdery single-layer film, any resin material may be fundamentally used. However, it should be chosen from materials which do not disturb, destroy or injure the arrangement of powdery particles in the powdery single-layer film when the resin layer is formed by coating or printing. In the case that a coating liquid or ink obtained by dissolving and diluting a resin material in an organic solvent, it is necessary that the organic solvent does not or hardly swells or dissolve the binder layer or coating layer in which the powdery particles are embedded. The resin layer formed on the image-like powdery single-layer film composed of power particles is usually laminated on both the binder layer or coating layer and the powdery particles, but it is possible to laminate only on the binder layer or coating layer or on the powdery particles depending on selection of materials.

The powdery single-layer film laminate according to the present invention are excellent in scratch resistance and stain resistance, because it is formed as described above. According to the methods of the present invention, the powdery single-layer film laminate having excellent scratch resistance and stain resistance can be easily produced. Further, according to the present invention, the powdery single-layer film having remarkably improved scratch resistance and stain resistance can be formed in image state without using the releasing film, because a dry coating layer composed of a polymer resin having Tg: 60° C. or higher is once formed on the substrate, and the powdery particles are attached to and embedded in the coating layer after an organic solvent is imagewise supplied on the coating layer by means of ink jet, etc. to give tackiness sufficient to attach the powder.

EXAMPLES

The present invention will be illustrated in greater detail with reference to examples and comparative examples hereinafter.

Example 1

Polymethyl methacrylate (trade name: Paralloyd A-21, produced by Rohm & Haas Co., Tg: 105° C.) was dissolved in a solvent mixture consisting of methyl ethyl ketone/cyclohexanone (1:1) to prepare a solution of 20% solid content. The resultant solution was applied by a wire bar to a 75 μm thick transparent PET film which was subjected to adhesion improvement treatment (corresponding to 2.5 μm of dry thickness). After air-drying for 1 minutes, methylsilicone fine particles having average diameter of 4.5 μm (trade name: Tospearl 145, produced by GE Toshiba Silicone Co., Ltd.) were scattered on the coated surface. The PET film having a coating layer, to which the fine particles were attached, was then immersed in a container in which the above-mentioned fine particles and truly spherical zirconia spheres having a particle diameter of 0.5 mm were placed as a pressing medium, while vibrating this container, thereby embedding the fine particles in the coating layer. Thereafter, the surplus fine particles were removed by washing with water, followed by drying in a 60° C. constant temperature oven for 3 hours to remove residual solvent, thereby producing a powdery single-layer film laminate having a powdery single-layer film in which each particle was embedded in a partially protruded state on the surface of the binder layer.

Example 2

A coating liquid prepared by dissolving 8 parts by weight of UV hardening silicone acrylate (trade name: UVHC-1105, produced by GE Toshiba Silicone Co., Ltd.), 2 parts by weight of polymethyl methacrylate in 20 parts by weight of methyl isobutyl ketone was applied by a wire bar to a 75 μm thick transparent PET film which was subjected to adhesion improvement treatment (corresponding to 3.0 μm of dry thickness). After drying at 100° C. for 1 minute, methylsilicone fine particles having average diameter of 4.5 μm (trade name: Tospearl 145, product of GE Toshiba Silicone Co., Ltd.) were scattered on the coated surface. The PET film having a coating layer, to which the fine particles were attached, was then immersed in a container in which the above-mentioned fine particles and truly spherical zirconia spheres having a particle diameter of 0.5 mm were placed as a pressing medium, while vibrating this container, thereby embedding the fine particles in the coating layer. After the surplus fine particles were removed by washing with water, the coating layer was hardened by irradiating an ultraviolet ray of 600 $mJ/cm^2$ as integration quantity of light by means of a conveyor type UV irradiation equipment (metal halide lamp) to produce a powdery single-layer film laminate having a powdery single-layer film in which each particle was embedded in a partially protruded state on the surface of the binder layer.

Example 3

Polymethyl methacrylate (trade name: Paralloyd A-21, Rohm & Haas Co., Tg: 105° C.) was dissolved in methyl ethyl ketone to prepare a solution of 20% solid content. The resultant solution was applied by a wire bar to a 75 μm thick transparent PET film which was subjected to adhesion improvement treatment, followed by drying at 100° C. for 2 minutes by a blast drier to form a dry coating layer having the thickness of 2.5 μm. On the surface of the resultant coating layer was applied a solvent mixture of ethanol/cyclohexanone (weight ratio: 2/1) by spray coating. After air-drying for 1 minute, methylsilicone fine particles having average diameter of 4.5 μm (trade name: Tospearl 145, product of GE Toshiba Silicone Co., Ltd.) were scattered on the surface of the coating layer. The PET film having a coating layer, to which the fine particles were attached, was then immersed in a container in which the above-mentioned fine particles and truly spherical zirconia spheres having a particle diameter of 0.5 mm were placed as a pressing medium, while vibrating this container, thereby embedding the fine particles in the coating layer. Thereafter, the surplus fine particles were removed by washing with water, followed by drying in a 60° C. constant temperature oven for 3 hours to remove residual solvent, thereby producing a powdery single-layer film laminate having a powdery single-layer film in which each particle was embedded in a partially protruded state on the surface of the binder layer.

Example 4

A coating prepared by dissolving 8 parts by weight of polymethyl methacrylate (trade name: Paralloyd A-21, Rohm & Haas Co., Tg: 105° C.) and 2 parts by weight of UV hardening silicone acrylate (trade name: UVHC-1105, produced by GE Toshiba Silicone Co., Ltd.) in 30 parts by weight of methyl isobutyl ketone was applied by a wire bar to a 75 μm thick transparent PET film which was subjected to adhesion improvement treatment. After drying at 100° C. for 1 minute, the coating layer was hardened by irradiating an ultraviolet ray of about 600 $mJ/cm^2$ as integration quantity of light by means of a conveyor type UV irradiation equipment (metal halide lamp) to form a dry coating layer having the thickness of 2.0 μm. To the coating layer was applied a solvent mixture consisting of ethanol/cyclohexanone (weight ratio: 2/1) by a wire bar and dried at 60° C. for 1 minute. Thereafter, it was processed by the same manner as in Example 1 to produce a powdery single-layer film laminate having a powdery single-layer film in which each particle was embedded in a partially protruded state on the surface of the binder layer.

Comparative Example 1

A powdery single-layer film laminate was produced by the same manner as in Example 1, except that polymethyl methacrylate in the Example 1 was changed for ethyl methacrylate copolymer (Trade name: Paralloyd B-72, Rohm & Haas Co., Tg: 40° C.).

Comparative Example 2

An acrylic adhesive (Trade name: H-6F, produced by Soken Kagaku K.K., Tg: −35° C.) was diluted with methyl isobutyl ketone and applied by a wire bar to a 75 μm thick transparent PET film which was subjected to adhesion improving treatment (corresponding to dry thickness of 3.0 μm). After drying at 100° C. for 1 minute, methylsilicone fine particles having average diameter of 4.5 μm (trade name: Tospearl 145, product of GE Toshiba Silicone Co., Ltd.) were scattered on the coated surface. The PET film having a pressure sensitive adhesive layer, to which the fine particles were attached, was then immersed in a container in which the above-mentioned fine particles, and truly spherical zirconia spheres having a particle diameter of 0.5 mm were placed as a pressing medium, while vibrating this container, thereby embedding the fine particles in the pressure sensitive adhesive layer. The surplus fine particles were removed by washing with water to obtain a powdery single-layer film laminate.

Evaluation

When the surface of the powdery single-layer film laminate produced as mentioned above was observed by SEM, it was observed that the silicone particles were embedded with high packing density in the state of powdery single-layer film in all cases. Furthermore, scratch resistance and stain resistance of them were evaluated by the following methods. The evaluation results are shown in the following table 1.

(Scratch Resistance)

The surface of the powdery single-layer film was rubbed by a nail and how to attach the scratch was observed. Evaluation criteria are as follows.

A: hardly damaged. B: damaged a little. C: damaged easily.

(Stain Resistance)

On the surface of the powdery single-layer film was written down with a 2B pencil, followed by washing with detergent/water. The remainder conditions of stain by the pencil were observed. Evaluation criteria are as follows.

A: stain is removed completely. B: stain remains a little.

C: The writing trace is clearly recognized or the stain has considerably remained.

TABLE 1

| | Tg of Binder layer (° C.) | Scratch resistance | Stain resistance |
|---|---|---|---|
| Example 1 | 105 | A | A |
| Example 2 | * | A | A |
| Example 3 | 105 | A | A |
| Example 4 | * | A | A |
| Comparative Example 1 | 40 | B | A |
| Comparative Example 2 | −35 | C | C |

*: When a material hardened on the glass plate was scratched away and DSC measurement of it was performed (temperature was raised from −100° C.), a change which seemed to be Tg could not be observed.

As be obvious from the Table 1, the scratch resistance and the stain resistance are inferior in the case of comparative examples that the Tg of the binder layer is lower than 60° C., while both of them are excellent in examples of the present invention.

Example 5

Polymethyl methacrylate (trade name: Paralloyd A-21, produced by Rohm & Haas Co., Tg: 105° C.) was dissolved in methyl isobutyl ketone to prepare a solution of 20% solid content. The resultant solution was applied by a wire bar to a 75 μm thick transparent PET film which was subjected to adhesion improvement treatment, followed by drying at 100° C. for 2 minutes by a blast drier to form a dry coating layer having the thickness of 2.5 $\mu$m. Using an ink jet printer (Trade name: S7S-Basic, made by Imaje Co.) equipped with a cartridge filled with methyl isobutyl ketone instead of ink, alphabet characters were recorded in 16 dots on the surface of the resultant coating layer. After air-drying for 1 minute, MMA type fine color particles (Trade name: BX-20 Black, produced by Sekisui Kaseihin Kogyo Co.) having an average particle size of 20 $\mu$m were scattered on the coated surface. The PET film having a coating layer, to which the fine particles were attached, was then immersed in a container in which the above-mentioned fine color particles and truly spherical zirconia spheres having a particle diameter of 0.5 mm were placed as the pressing medium, while vibrating this container, thereby embedding the fine color particles in the coating layer. Thereafter, the surplus fine particles were removed by washing with water, followed by drying in a 60° C. constant temperature oven for 3 hours to remove residual solvent, thereby producing a powdery single-layer film laminate having an image-like powdery single-layer film in which each particle was embedded in a partially protruded state on the surface of the binder layer.

Example 6

A coating prepared by dissolving 8 parts by weight of polymethyl methacrylate (trade name: Paralloyd A-21, produced by Rohm & Haas Co., Tg: 105° C.) and 2 parts by weight of UV hardening silicone acrylate (trade name: UVHC-1105, produced by GE Toshiba Silicone Co., Ltd.) in 30 parts by weight of methyl isobutyl ketone was applied by a wire bar to a 75 $\mu$m thick transparent PET film which was subjected to adhesion improvement treatment. After drying at 100° C. for 1 minute, the coating layer was hardened by irradiating an ultraviolet ray of about 600 mJ/cm$^2$ as integration quantity of light by means of a conveyor type UV irradiation equipment (metal halide lamp) to form a dry coating layer having the thickness of 2.0 $\mu$m. Thereafter, a powdery single-layer film laminate having an image-like powdery single-layer film in which each particle was embedded in a partially protruded state on the surface of the binder layer was produced by the same manner as in Example 5, except that the organic solvent putting in the cartridge was changed for a solvent mixture consisting of ethanol/cyclohexanone (weight ratio: 2/1).

Comparative Example 3

A powdery single-layer film laminate was produced by the same manner as in Example 5, except that polymethyl methacrylate in the Example 5 was changed for ethyl methacrylate copolymer (trade name: Paralloyd B-72, produced by Rohm & Haas Co., Tg: 40° C.).

Evaluation

When the surface of the powdery single-layer film laminates produced as mentioned above was observed by SEM, it was observed that the silicone particles were embedded with high packing density in the state of powdery single-layer film in all cases. Furthermore, scratch resistance and stain resistance of them were evaluated by the following methods. The evaluation results are shown in the following table 2. Evaluation criteria of the scratch resistance and the stain resistance are the same as those in Table 1.

TABLE 2

| | Tg of Binder layer (° C.) | Scratch resistance | Stain resistance |
|---|---|---|---|
| Example 5 | 105 | A | A |
| Example 6 | 100 | A | A |
| Comparative Example 3 | 40 | B | A |

As be obvious from the Table 2, the scratch resistance and the stain resistance are inferior in the case of comparative examples that the Tg of the binder layer is lower than 600° C., while both of them are excellent in examples of the present invention.

When alphabet characters were formed in white PET film using the ink for ink jet printers, the width of the characters was 2 mm, while the width of the character composed of the powdery single-layer film thickened a little with 2.5 mm in the case of the above-mentioned Examples 5 and 6 and Comparative Example 3. This is a result of deriving from that the organic solvent spewed from the ink jet printer spreads on the surface of the binder layer. It is therefore possible to form a desired image-like powdery single-layer film, if the ink jet is manipulated considering this spread.

What is claimed is:

1. A powdery single-layer film laminate which comprises a substrate, a binder layer and a powdery single-layer film composed of a large number of powdery particles embedded in a single-layer in a partially protruded state on the surface of said binder layer, wherein said binder layer has a Tg of at least 60° C. or has substantially no Tg, and is formed by hardening a mixture comprising a hardening liquid component and thermoplastic polymethyl methacrylate having a Tg of at least 60° C., said hardening liquid component comprising a photosetting acrylic resin.

2. The powdery single-layer film laminate according to claim 1, wherein said powdery single-layer film is formed in the state of image.

* * * * *